(12) United States Patent
Soriano et al.

(10) Patent No.: US 8,355,171 B2
(45) Date of Patent: Jan. 15, 2013

(54) ALIGNMENT COMPENSATION BY PRINTER DRIVER

(75) Inventors: Randy Cruz Soriano, San Leandro, CA (US); Kenneth H. Young, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 72 days.

(21) Appl. No.: 12/894,379

(22) Filed: Sep. 30, 2010

(65) Prior Publication Data
US 2012/0081718 A1    Apr. 5, 2012

(51) Int. Cl.
*H04N 1/60* (2006.01)
*G06F 3/12* (2006.01)

(52) U.S. Cl. .................... 358/1.9; 358/1.5; 358/504

(58) Field of Classification Search ............. 358/1.1, 358/1.5, 1.6, 1.9, 1.12, 1.14, 1.15, 1.18, 406, 358/468, 504; 382/286, 287, 289, 291, 294
See application file for complete search history.

(56) References Cited

U.S. PATENT DOCUMENTS

| | | | | |
|---|---|---|---|---|
| 5,121,468 A * | 6/1992 | Daino | | 358/1.2 |
| 5,813,771 A * | 9/1998 | Ur et al. | | 400/74 |
| 6,795,216 B1 * | 9/2004 | Yamada et al. | | 358/3.21 |
| 6,825,944 B1 * | 11/2004 | Noda | | 358/1.15 |
| 6,887,000 B2 * | 5/2005 | Michaelson | | 400/74 |
| 7,167,664 B2 * | 1/2007 | Nomura et al. | | 399/167 |
| 7,420,719 B2 * | 9/2008 | Mongeon | | 358/504 |
| 2003/0175602 A1 | 9/2003 | Kazama | | |
| 2004/0083915 A1 * | 5/2004 | Michaelson | | 101/484 |
| 2006/0033801 A1 * | 2/2006 | Yun | | 347/179 |
| 2006/0139670 A1 * | 6/2006 | Hoblit | | 358/1.12 |
| 2007/0013964 A1 * | 1/2007 | Ono | | 358/406 |
| 2007/0019258 A1 * | 1/2007 | Hattori | | 358/518 |
| 2007/0177212 A1 * | 8/2007 | Uchida | | 358/1.18 |
| 2007/0230825 A1 * | 10/2007 | Hasegawa et al. | | 382/294 |
| 2008/0181634 A1 * | 7/2008 | Kinoshita | | 399/39 |
| 2009/0231605 A1 * | 9/2009 | Kuwahara | | 358/1.9 |

OTHER PUBLICATIONS

Extended Search Report issued on Jul. 19, 2012 by the European Patent Office in corresponding European Patent Application No. 11174777.0.

\* cited by examiner

*Primary Examiner* — Kimberly A Williams

(74) *Attorney, Agent, or Firm* — Buchanan Ingersoll & Rooney PC

(57) ABSTRACT

A method of compensating for misalignment of a print engine of an image forming apparatus, which includes: (a) forwarding a request from a host computer having a printer driver to an image forming apparatus for reference data of a printable area of the print engine; (b) sending the reference data of the printable area of the print engine to the printer driver; (c) comparing the reference data of the printable area of the print engine to an ideal reference data of the printable area of a print job; and (d) if the reference data of the printable area of the print engine is different than the ideal reference data of the printable area of the print job, generating a new reference data of the printable area of the printable area to adjust for the difference in printable area between the ideal reference data of the printable area of the print job and the reference data of the printable area of the print engine.

21 Claims, 4 Drawing Sheets

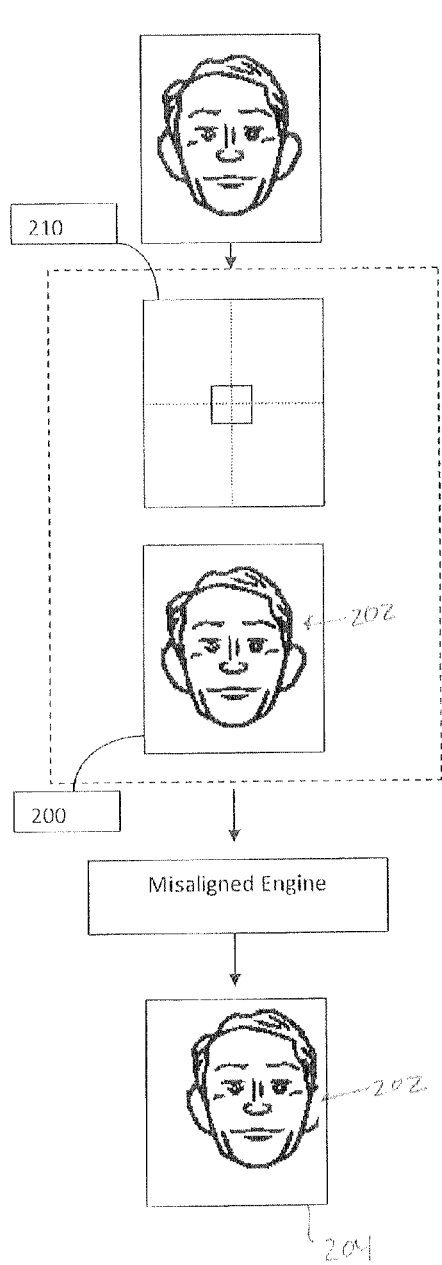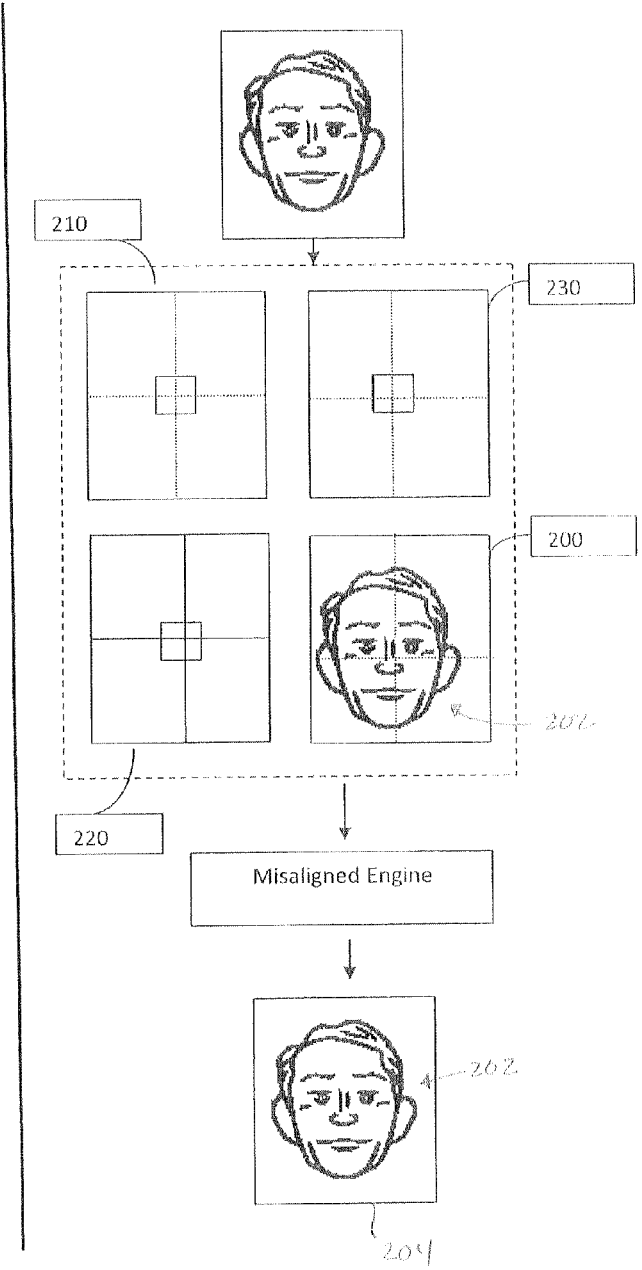

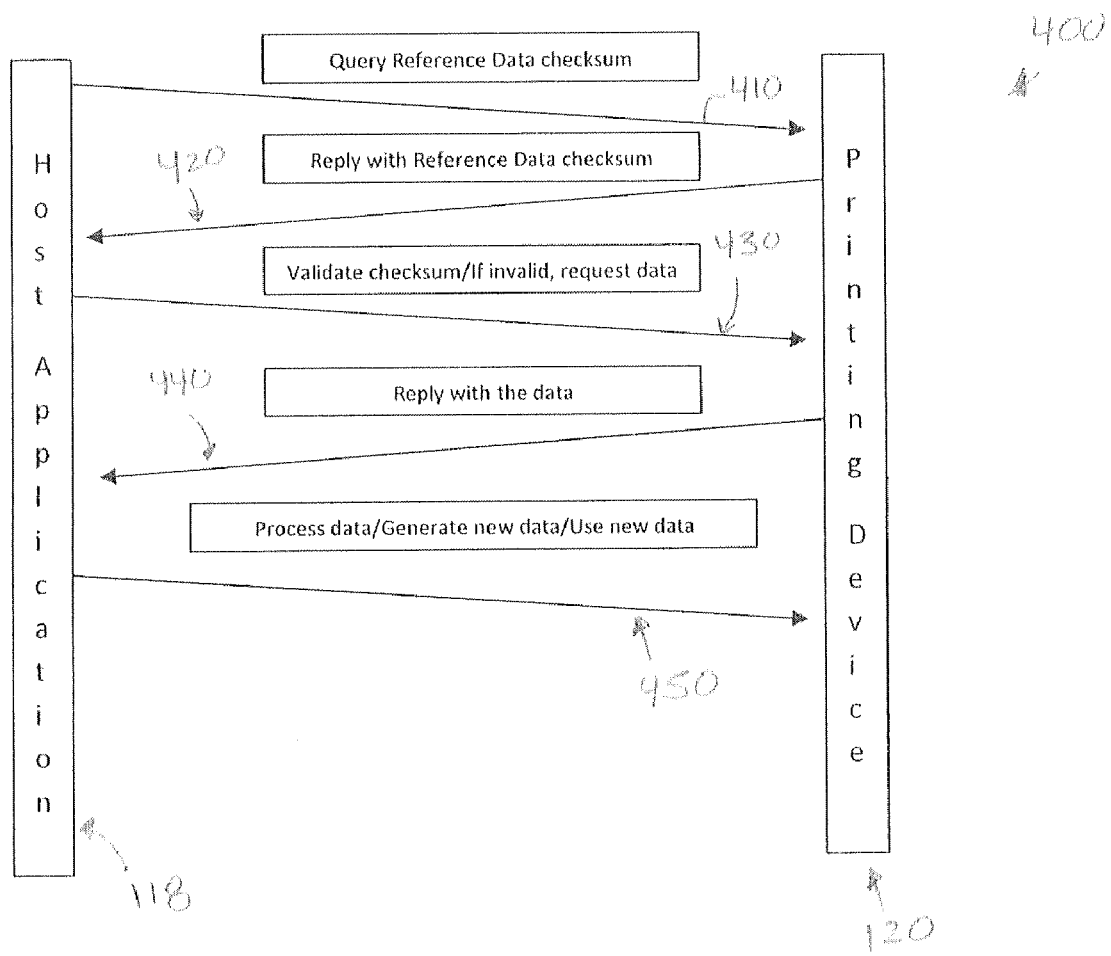
FIG. 4 – Interaction between the Printer Driver/Host Application and the Printing Device FIG. 5 – The printing system.
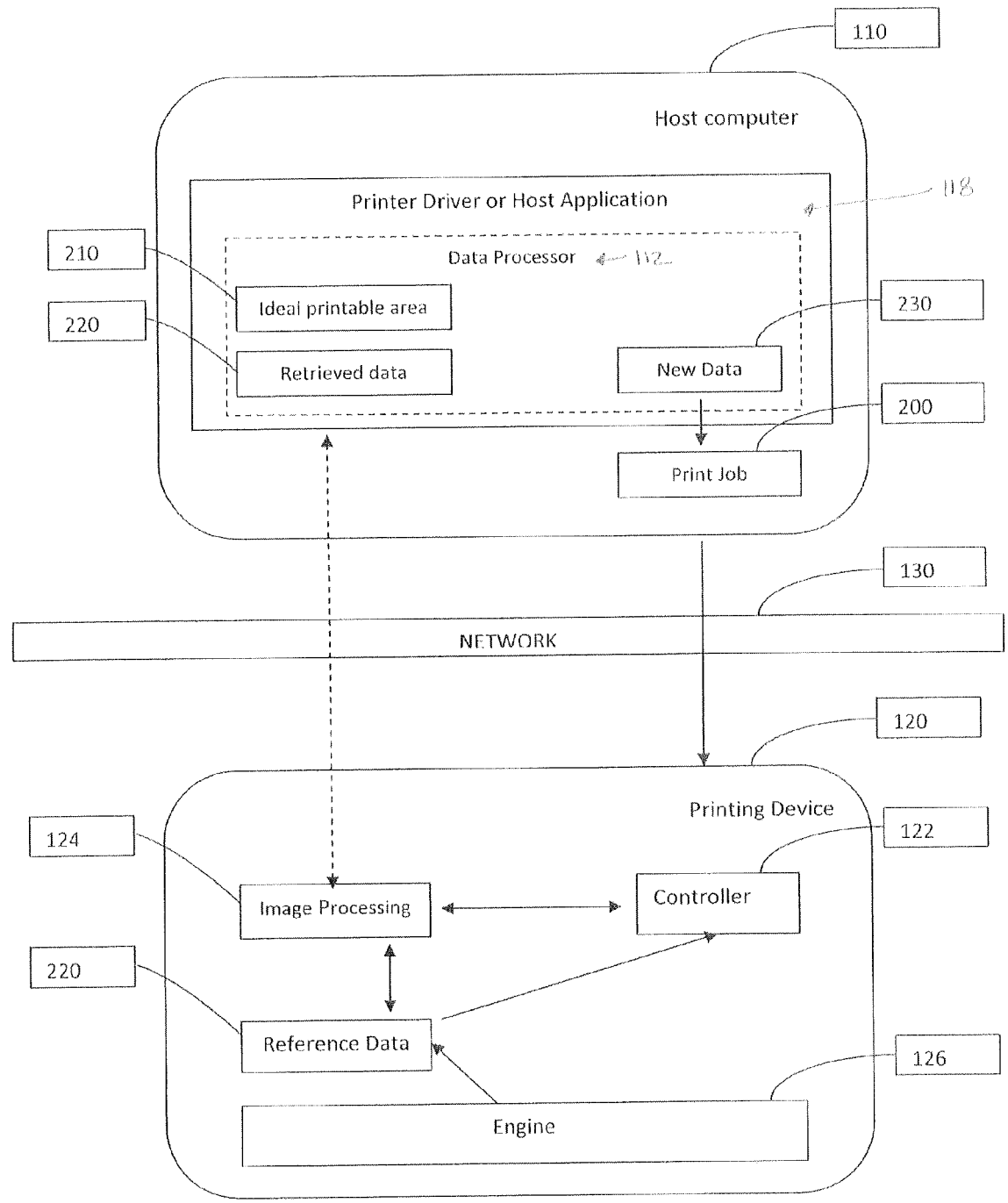

ALIGNMENT COMPENSATION BY PRINTER DRIVER

FIELD OF THE INVENTION

This invention relates to an image forming apparatus and, more particularly to a system and method for compensating for misalignment of a print engine within an image forming apparatus using a host application and/or printer driver of a computing device.

BACKGROUND OF THE INVENTION

In today's printing devices, a typical generated output may consist of an image data on printable media such as various types of papers. It is possible a print job submitted to a printing device may have output where the printable area on a printable media is out of alignment. It can be appreciated that when this happens, the image data may appear either clipped to the right, left, top, bottom edge of the printable media.

In addition, when the printing system is used for overprinting (i.e., a preprinted form, in which one image is superimposed on another), if the print engine is out of alignment, the subsequently printed images on the preprinted forms will be misaligned with the original images. When this occurs, considerable time and materials may be wasted in the course of reloading and raster image processing (ripping) of the print job in order to try to mitigate the problem.

In a current printing device, the printing device includes options, which allow the user to manually adjust the printing device so that the out of alignment portion of the printable area can be corrected, thus preventing the image data from being clipped. However, this method can be cumbersome as the process needs to be done for each and every printing device.

Accordingly, it would be desirable to have a method and system, which makes the adjustment automatically by requesting a reference data of a printable area from the image forming apparatus for a print engine and comparing the reference data to an ideal reference data of the printable area for a print job, and if necessary generating a new reference data of the printable area before sending the print job to the print engine of an image forming apparatus.

OBJECTS AND SUMMARY

The present invention has been made in consideration of the above issues, and provides an improved image forming apparatus and method which compensates for misalignment of a print engine of an image forming apparatus.

In accordance with an exemplary embodiment, a method of compensating for misalignment of a print engine of an image forming apparatus, comprises the steps of: (a) forwarding a request from a host computer having a printer driver to an image forming apparatus for reference data of a printable area of the print engine; (b) sending the reference data of the printable area of the print engine to the printer driver; (c) comparing the reference data of the printable area of the print engine to an ideal reference data of the printable area of a print job; and (d) if the reference data of the printable area of the print engine is different than the ideal reference data of the printable area of the print job, generating a new reference data of the printable area to adjust for the difference in the printable area between the ideal reference data of the printable area of the print job and the reference data of the printable area of the print engine.

In accordance with another exemplary embodiment, a computer program product comprising a non-transitory computer usable medium having a computer readable code embodied therein, the computer readable program code configured to cause the printer driver and image forming apparatus to execute a process for producing a print job, the process comprising the steps of: (a) forwarding a request from a host computer having a printer driver to an image forming apparatus for reference data of a printable area of the print engine; (b) sending the reference data of the printable area of the print engine to the printer driver; (c) comparing the reference data of the printable area of the print engine to an ideal reference data of the printable area of a print job; and (d) if the reference data of the printable area of the print engine is different than the ideal reference data of the printable area of the print job, generating a new reference data of the printable area to adjust for the difference in the printable area between the ideal reference data of the printable area of the print job and the reference data of the printable area of the print engine.

In accordance with a further exemplary embodiment, a printing system comprising: a host computer having a printer driver; and an image forming apparatus having a memory unit and a print engine connected to the memory unit for forming an image on a recording medium, wherein the printer driver and the image forming apparatus compensate for misalignment of a print engine of the image forming apparatus by performing the following steps: (a) forwarding a request from the host computer to the image forming apparatus for reference data of a printable area of the print engine; (b) sending the reference data of the printable area of the print engine to the printer driver; (c) comparing the reference data of the printable area of the print engine to an ideal reference data of the printable area of a print job; and (d) if the reference data of the printable area of the print engine is different than the ideal reference data of the printable area of the print job, generating a new reference data of the printable area to adjust for the difference in the printable area between the ideal reference data of the printable area of the print job and the reference data of the printable area of the print engine.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2 is a diagram of a print job wherein the print engine of an image forming apparatus is misaligned without alignment compensation by a host application or printer driver of a host computer.

FIG. 3 is a diagram of a print job wherein the print engine of an image forming apparatus is misaligned and the host application or printer driver of the host computer includes alignment compensation in accordance with an exemplary embodiment.

FIG. 4 is a diagram of an interaction between a printer driver/host application of a host computer and a printing device in accordance with a further exemplary embodiment.

FIG. 5 is a diagram of a printing system, which includes a host computer and a printing device in accordance with an exemplary embodiment.

DESCRIPTION OF THE PREFERRED EMBODIMENTS

Figure 1:
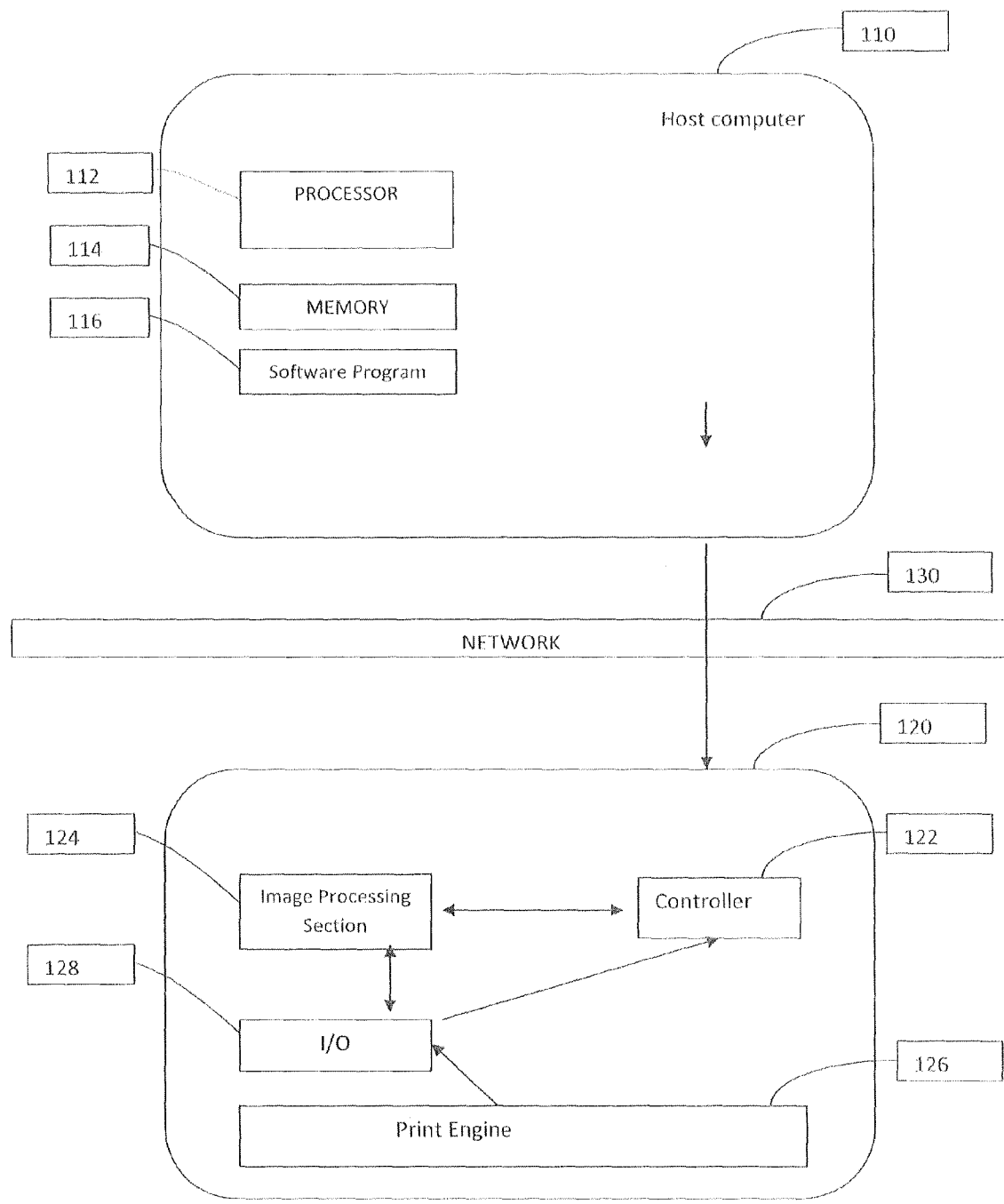
FIG. 1 is a diagram of a data processing system, which includes a host computer and an image forming apparatus connected to the host computer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a printer driver or host application can make the adjustment to the position of the printable area by compensating based on a given reference data from a printing device. In accordance with an exemplary embodiment, the printer driver or host application has its own ideal reference data of the printable area. The reference data that is retrieved from the printing device will then compared to the ideal reference data of the printer driver or host application. Based on the reference data and ideal reference data of the printable area, new data is generated to compensate for the alignment problem on the printing device. The following illustrations describe the process of this method and a system for implementation thereof.

The methods described herein can be implemented in a data processing system 100 which includes a host computer 110 and an image forming apparatus 120 preferably in the form of a printer 122 connected to the host computer 110. A typical structure of the data processing system is shown in FIG. 1. The host computer 110 includes a processor 112 and one or more memories 114 for storing software programs 116 and data (such as files to be printed). The host computer 110 submits print jobs to the image forming apparatus (or printer) 120 by transmitting data representing the documents to be printed and information describing the print job. The image forming apparatus (or printer) 120 typically includes a controller 122, an image processing section (or data dispatcher) 124, a print engine 126, and an input/output (I/O) section 128.

The controller 122 may include a central processing unit (CPU), a random access memory (RAM), and a read only memory (ROM). The controller 122 processes the data and job information received from the host computer 110 to generate a print image. The image processing section 124 carries out various image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein.

The input/output (I/O) port 128 provides communications between the printer section and the host computer 110 and receives page descriptions (or print data) from the host for processing within the image forming apparatus 120. In accordance with an exemplary embodiment, the operation of printer section commences when it receives a page description from the host computer 120 via I/O port 128 in the form of a print job data stream. The host computer 110 and the image forming apparatus (or printer) 120 are preferably connected to one another via a network (e.g., LAN or WAN) 130. Examples of the network 130 consistent with embodiments of the invention include, but are not limited to, the Internet, an intranet, a local area network (LAN) and a wide area network (WAN). The image forming apparatus 120 and the client device can be connected with a wire or be connected with wireless by using radio frequency (RF) and/or infrared (IR) transmission.

Examples of image forming apparatuses 120 consistent with exemplary embodiments of the invention include, but are not limited to, a laser beam printer (LBP), an LED printer, a multi-functional laser beam printer including copy function (MFP). In accordance with an exemplary embodiment, the image forming apparatus 120 is preferably a color printer or a black and white (B/W) printer. In accordance with another exemplary embodiment, the image forming apparatus 120 is configured as a multi-function peripheral (MFP) device or all-in-one (AIO) that includes a printer section for converting print data inputted from outside to image data and forming and printing out the converted image onto a printable media, a scanner section for optically reading a document, and a facsimile section for facsimile receiving and transmitting image data to and from external apparatuses through public lines.

FIG. 2 is a diagram of a print job 200 wherein the print engine 126 is misaligned without alignment compensation. The host computer (or Personal Computer, i.e., PC) has a printer driver or host application 118 (FIG. 5) having an ideal reference data of a printable area 210 for a print job 200. The ideal reference data of the printable area 210 preferably positions any image and/or text 202 within the printable area of the printable media. In accordance with an exemplary embodiment, the print job 200 contains the ideal reference data of the printable area 210 which is submitted to the printing device. If the print engine of the printing device is misaligned, the print job 200 submitted to the printing device may produce a printed image or document where the printable area on the printable media 204 is out of alignment, i.e., the images and text may be shifted to the right, left, top, and/or bottom edge of the printable media (i.e., in an x and/or y direction on the printable media) or any combination thereof. For example, the image data may appear either clipped to the right, left, top, bottom edge of the printable media, such that a portion of the image and/or text may be outside of the printable area of the printable media. In addition, it can be appreciated that many printers (or image forming apparatuses) cannot print in a defined margin at the edge of the printable media 204, because such a margin is needed for the printable media handling mechanism of the printer to handle the printable media 204 during printing. Thus, if the data area of a page or sheets extends to the full extent of the intended printable medium, and the print engine is misaligned, a portion of the image and/or text will exceed the maximum printable area.

FIG. 3 is a diagram of a print job 200 wherein the print engine 126 of an image forming apparatus 120 is misaligned and the host application or printer driver 118 (FIG. 5) of the host computer 110 includes alignment compensation in accordance with an exemplary embodiment. The software programs 116 of the host computer (or Personal Computer, i.e., PC) 110 includes a printer driver or host application preferably having an ideal reference data of a printable area 210 for a print job 200. Initially, the host application will forward a request to an image forming apparatus for a reference data of the printable area 220 of the print engine of the image forming apparatus. In accordance an exemplary embodiment, the reference data of the printable area 220 of the print engine is a calibration of the print alignment for the print engine associated with image forming apparatus 120.

Thus, each print engine will have a reference data of the printable area 220, which can be manually calculated and input into the image forming apparatus 120, or alternatively, based on data obtained and processed by the image forming apparatus. The reference data of the printable area 220 will contain information relating to the print engine misalignment.

In accordance with an exemplary embodiment, the image forming apparatus sends the reference data of the printable area 220 of the print engine to the host application. The host application compares the reference data of the printable area 220 of the print engine to an ideal reference data of the printable area 210 of the print job, and if the reference data of the printable area 220 of the print engine is different than the ideal reference data of the printable area 210 of the print job, the host application generates a new reference data of the printable area 230 to compensate and adjust for the difference in the printable area between the ideal reference data of the printable area 210 of the print job and the reference data of the printable area 220 of the print engine. For example, if the print engine 126 is misaligned and the printed image and/or text is clipped on the right side and moved slightly towards the top of the sheet (as shown in FIG. 2), the new reference data of the printable area 230 will move the image and/or text to the left and slightly towards the bottom of the sheet (as shown in FIG. 3). The new reference data of the printable area 230 is then used when submitting the print job 200 to the printing device.

FIG. 4 is a diagram of an interaction 400 between a host application (or printer driver) 118 of a host computer 110 and a printing device 120 in accordance with a further exemplary embodiment. As shown in FIG. 4, in step 410, the host application sends a query reference data checksum to the printing device requesting a checksum on reference data of a printable area of the print engine of the printing device. In step 420, the printing device replies to the host application with a response to the request for the reference data checksum of the printable area of the print engine. In step 430, the host application performs a validation of the reference data checksum of the printable area, and if invalid, i.e., the reference data of the printable area of the print engine requires adjustment of an ideal reference data for a print job within the host application, the host application requests the reference data of the printable area from the printing device. In step 440, the printing device returns the reference data of the printable area to the host application. In step 450, the host application processes the data and generates a new data reference of the printable area, which is then sent to the printing device, which processes the new data reference data of the printable area and prints a copy of the data in accordance with the new reference data of the printable area.

It can be appreciated that once the host application validates that the print engine's reference data of a printable area has been received, the printer driver or host application 118 forwards data representing a document to be printed in the print job to the image forming apparatus 120 and at least one copy of the document is printed with the new data reference of the printable area 230, if needed. If the ideal reference data of the printable area 210 of the print job is equal to the reference data of the printable area 220 of the print engine, the data representing the document to be printed in the print job is sent to the print engine of the forming apparatus with the ideal reference data of the printable area 210. Alternatively, if the ideal reference data of the printable area 210 of the print job is not equal to the reference data of the printable area 220 of the print engine, the data representing the document to be printed in the print job 200 is sent to the print engine of the image forming apparatus with the new reference data of the printable area 230.

FIG. 5 is a diagram of a printing system, which includes a host computer 110 and a printing device 120 in accordance with the exemplary embodiment. As shown in FIG. 5, the host computer 110 includes a host application (or printer driver) 118. The printing device 120 includes an image processing section (or data dispatcher) 124, a controller 122, and a print engine 126 having a reference data of a printable area associated with the print engine 126.

In accordance with the exemplary embodiment, the data processor 112 associated with the printer driver or host application 118 includes an ideal reference data of the printable area 210 for a document of a print job 200. In accordance with an exemplary embodiment, the printer driver or host application 118 forwards a request to the data dispatcher 124 of the image forming apparatus 120 for reference data of the printable area 220 of the print engine 126 of the image forming apparatus 120. The data dispatcher 124 retrieves the reference data of the printable area 220 from the print engine 126 and/or controller 122 and sends the reference data of the printable area 220 of the print engine 126 to the printer driver or host application 118. The printer driver or host application 118 compares the reference data of the printable area 220 of the print engine 126 to an ideal reference data of the printable area 210 of the print job 200. If the reference data of the printable area 220 of the print engine 126 is different than the ideal reference data of the printable area 210 of the print job 200, the host application generates a new reference data of the printable area 230 of the printable area to compensate and adjust for the difference in printable area between the ideal reference data of the printable area 210 of the print job 200 and the reference data of the printable area 220 of the print engine 126. The new reference data of the printable area 230 is then sent as a print job 200 to be printed by the image forming apparatus (or printing device) 120.

In accordance with the exemplary embodiment, at least one copy of the document is printed on the image forming apparatus (or printing device) 120. It can be appreciated that the print job 200 can be sent via any suitable network (or network connection) 130. The image processing section (or data dispatcher) 124 preferably handles the communication between the host application (or printer driver) 118 and the image forming apparatus (or printing device) 120. The image processing section (or data dispatcher) 124 gathers the reference data from the controller 122 or directly from the print engine 126 of the image forming apparatus or printing device 120 and passes it on to the printer driver. It can be appreciated that the controller 122 can be embedded inside the printing device 120 or it can be an externally located and connected through the network 130.

It can be appreciated that the reference data of the printable area 220 of the print engine 126 can be recalibrated upon the occurrence of certain events, including but not limited to usage of the print engine 126. Alternatively, the reference data of the printable area 220 of the print engine 126 can be recalibrated upon events, such as beginning or ending of a print job 200, after a certain number of print jobs and/or printing of a number of sheets. In accordance with an exemplary embodiment, the recalibration of the reference data of the printable area 220 is preferably performed such that the print engine 126 does not cycle down.

It can be appreciated that the process and method can be introduced into the apparatus by updating the printer driver (or host application) 118 in the host computer 110 and/or the firmware in the non-volatile memory of the image forming apparatus 120. In this regard, the method may be brought to the apparatus in a form of a package of install software and the printer driver and firmware, which may be divided and/or compressed so that the install software effectively installs the printer driver and firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, can be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention can be implemented such that its software part has been written onto a recording medium in advance and will be read as required in operation.

Thus, as used in this disclosure and the appended claims, the term "image forming apparatus", "printer" or "printing device" should be broadly understood to refer to any machine that has a print function, including printers, copiers, and all-in-one machines which have printing, scanning and copying functions. The term "print job" and/or "printing" similarly include both printing and copying, i.e., it refers to producing images on a recording medium either from a data received from an external device such as a host computer or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of compensating for misalignment of a print engine of an image forming apparatus, comprising:
   (a) forwarding a request from a host computer having a printer driver to an image forming apparatus for reference data of a printable area of the print engine;
   (b) sending the reference data of the printable area of the print engine to the printer driver;
   (c) comparing the reference data of the printable area of the print engine to a print job having an ideal reference data of the printable area; and
   (d) if the reference data of the printable area of the print engine is different than the ideal reference data of the printable area of the print job, generating a new reference data of the printable area for the print job to adjust for the difference in printable area between the ideal reference data of the printable area of the print job and the reference data of the printable area of the print engine.

2. The method of claim 1, further comprising:
   (e) sending data representing a document to be printed in the print job from the host computer to the image forming apparatus; and
   (f) printing at least one copy of the document on the image forming apparatus.

3. The method of claim 2, wherein if the ideal reference data of the printable area of the print job is equal to the reference data of the printable area of the print engine, sending the data representing the document to be printed in the print job to the print engine with the ideal reference data of the printable area.

4. The method of claim 2, wherein if the ideal reference data of the printable area of the print job is not equal to the reference data of the printable area of the print engine, sending the data representing the document to be printed in the print job to the print engine of the image forming apparatus with the new reference data of the printable area.

5. The method of claim 1, further comprising recalibrating the reference data of the printable area of the print engine based on usage of the print engine of the image forming apparatus.

6. The method of claim 1, wherein the reference data of the printable area of the print engine is a calibration of a print alignment for the print engine associated with the image forming apparatus.

7. A computer program product comprising a non-transitory computer usable medium having a computer readable code embodied therein, the computer readable program code configured to cause the printer driver and image forming apparatus to execute a process for producing a print job, the process comprising the steps of:
   (a) forwarding a request from a host computer having a printer driver to an image forming apparatus for reference data of a printable area of the print engine;
   (b) sending the reference data of the printable area of the print engine to the printer driver;
   (c) comparing the reference data of the printable area of the print engine to a print job having an ideal reference data of the printable area; and
   (d) if the reference data of the printable area of the print engine is different than the ideal reference data of the printable area of the print job, generating a new reference data of the printable area for the print job to adjust for the difference in printable area between the ideal reference data of the printable area of the print job and the reference data of the printable area of the print engine.

8. The computer program product of claim 7, further comprising:
   (e) sending data representing a document to be printed in the print job from the host computer to the image forming apparatus; and
   (f) printing at least one copy of the document on the image forming apparatus.

9. The computer program product of claim 8, wherein if the ideal reference data of the printable area of the print job is equal to the reference data of the printable area of the print engine, sending the data representing the document to be printed in the print job to the print engine of the forming apparatus with the ideal reference data of the printable area.

10. The computer program product of claim 8, wherein if the ideal reference data of the printable area of the print job is not equal to the reference data of the printable area of the print engine, sending the data representing the document to be printed in the print job to the print engine of the image forming apparatus with the new reference data of the printable area.

11. The computer program product of claim 8, wherein the reference data of the printable area of the print engine is a calibration of a print alignment for the print engine associated with the image forming apparatus.

12. The computer program product of claim 7, further comprising recalibrating the reference data of the printable area of the print engine based on usage of the print engine of the image forming apparatus.

13. A printing system comprising:
a host computer having a printer driver; and
an image forming apparatus having a memory unit and a print engine connected to the memory unit for forming an image on a recording medium, wherein the printer driver and the image forming apparatus compensate for misalignment of the print engine of the image forming apparatus by performing the following steps:
 (a) forwarding a request from the host computer to the image forming apparatus for reference data of a printable area of the print engine;
 (b) sending the reference data of the printable area of the print engine to the printer driver of the host computer;
 (c) comparing the reference data of the printable area of the print engine to a print job having an ideal reference data of the printable area; and
 (d) if the reference data of the printable area of the print engine is different than the ideal reference data of the printable area of the print job, generating a new reference data of the printable area of the printable area for the print job to compensate for the difference in printable area between the ideal reference data of the printable area of the print job and the reference data of the printable area of the print engine.

14. The system of claim 13, wherein the host computer includes a data processor, which handles communication between the printer driver and the image forming apparatus for the host computer.

15. The system of claim 14, wherein the image forming apparatus includes a data dispatcher, which handles communication between the printer driver and the image forming apparatus for the image forming apparatus.

16. The system of claim 15, wherein the reference data of the printable area of the print engine of the image forming apparatus is hosted by the print engine.

17. The system of claim 15, wherein the image forming apparatus further includes a controller, which hosts the reference data of the printable area of the print engine of the image forming apparatus.

18. The system of claim 17, wherein the controller is embedded within the image forming apparatus.

19. The system of claim 17, wherein the controller is externally located and connected through a network connection.

20. The system of claim 13, wherein the printer driver is a host application.

21. The system of claim 13, wherein the reference data of the printable area of the print engine is a calibration of a print alignment for the print engine associated with the image forming apparatus.

* * * * *